Aug. 24, 1926.
H. HIORNS
VARIABLE SPEED GEARING
Filed Dec. 17, 1924   2 Sheets-Sheet 2
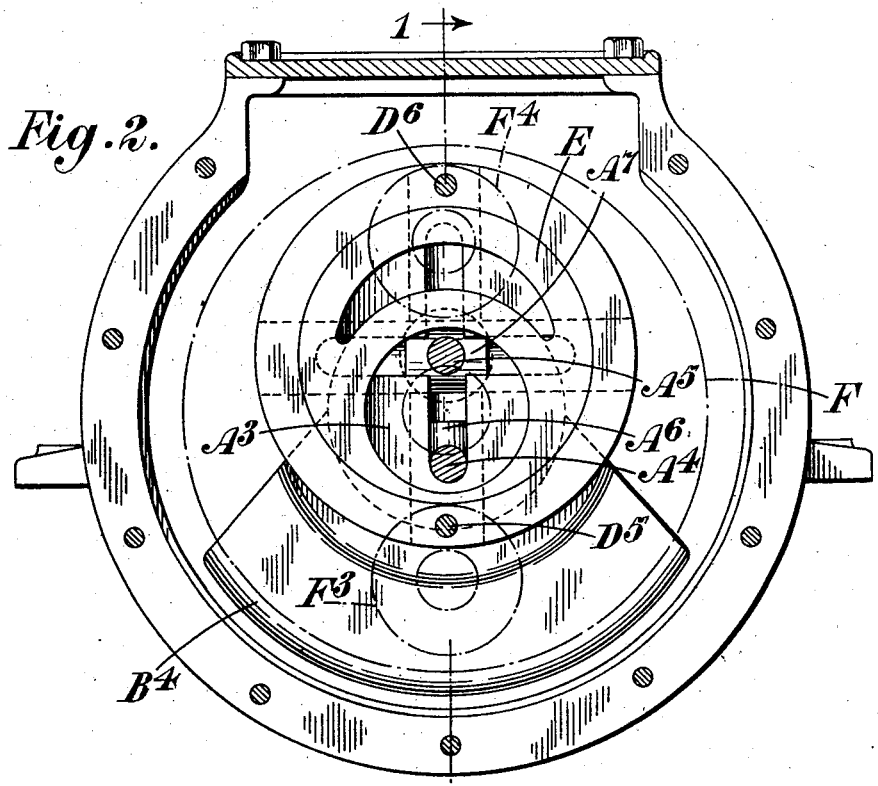
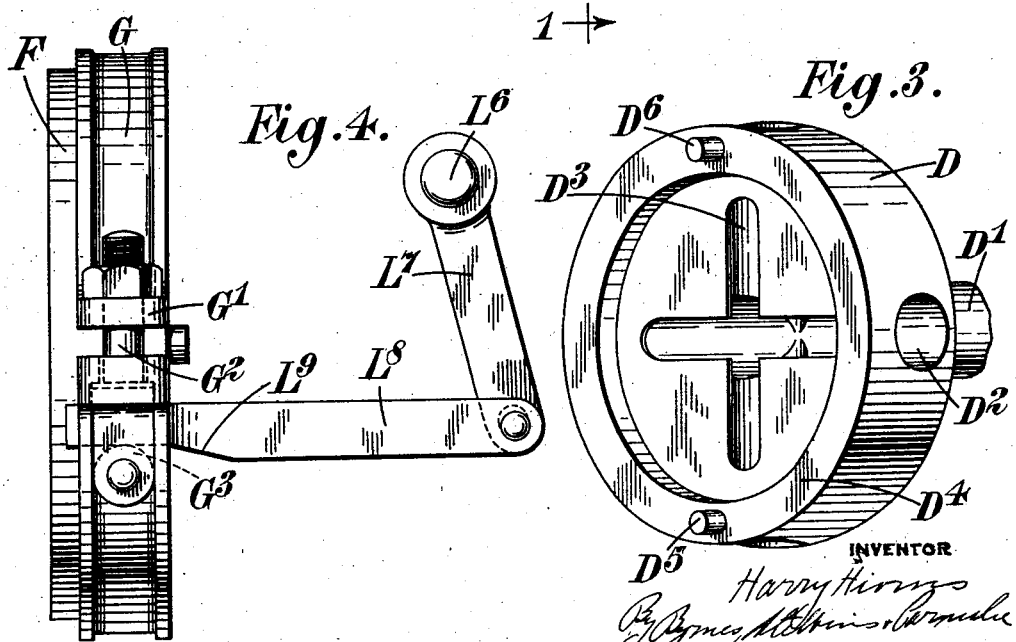
INVENTOR
Harry Hiorns
His Att'ys Patented Aug. 24, 1926.

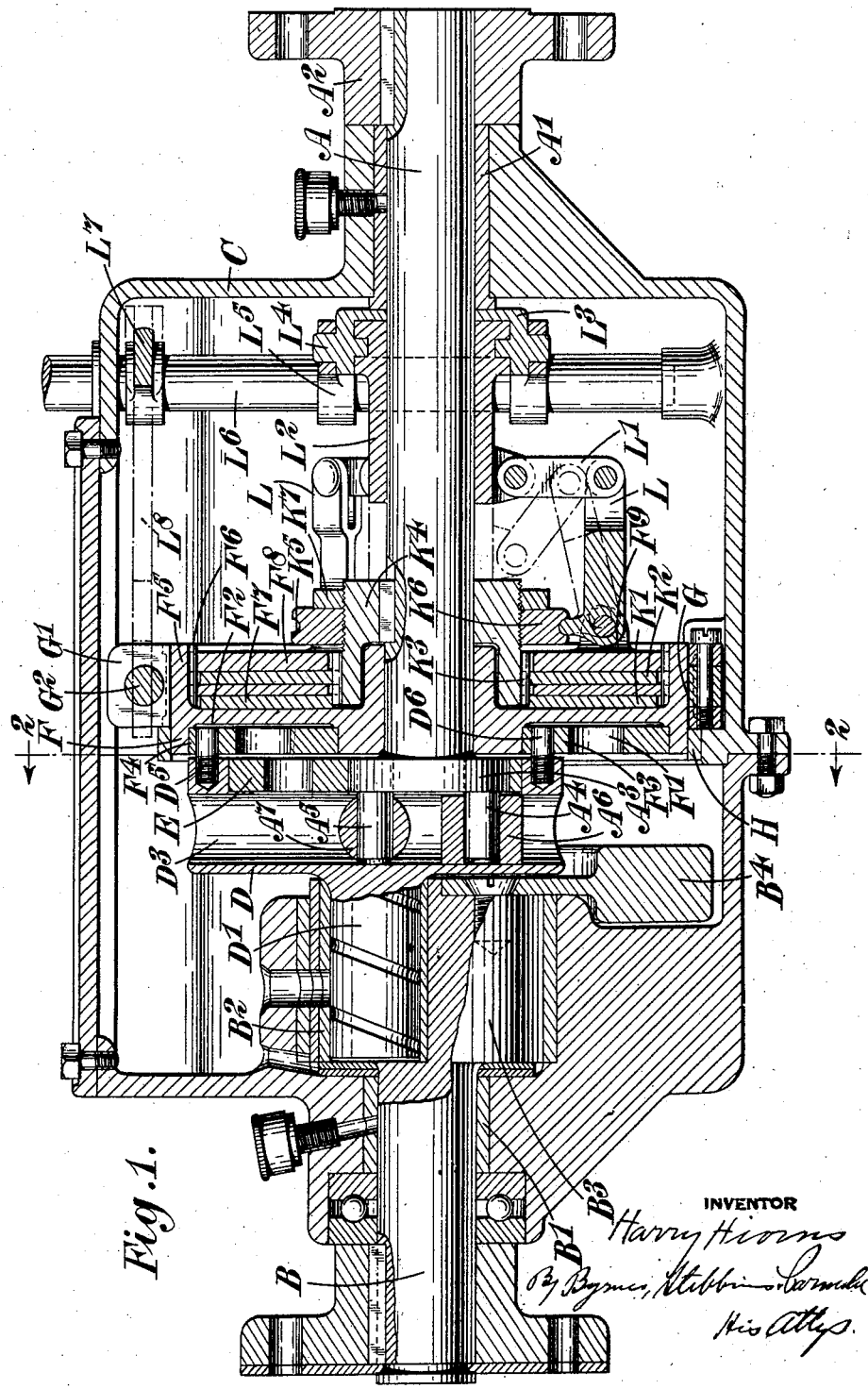

1,597,037

UNITED STATES PATENT OFFICE.

HARRY HIORNS, OF TORQUAY, ENGLAND.

VARIABLE-SPEED GEARING.

Application filed December 17, 1924, Serial No. 756,432, and in Great Britain January 14, 1924.

This invention has reference to gearing of the kind which comprises a rotatable member having crank pins to engage an eccentrically-disposed cross-slotted element so as to transmit motion between the member and the element. In known constructions of gearing of this kind the cross-slotted element is mounted upon a rotatable member coaxial with the first rotatable member and is in engagement with a controlling device which is capable of holding it from rotation while permitting lateral displacement, with the result that the cross-slotted element may be caused to move parallel to itself in a circular path in the reverse direction from that of the movement of the first rotatable member. It is an object of the present invention to provide a construction of this kind which is capable of giving forward and reverse drives with increased efficiency and simplicity. It is a subsidiary object of the invention to provide against lateral stresses set up in the transmission of power through the gear.

The invention comprises in a driving gear the combination of a driving-member, a coaxial driven-member, an intermediate cross-slotted element supported by one of these members to turn about an axis eccentric thereto, crank pins upon the other member in engagement with the slots of the cross-slotted element, a controlling-device for the cross-slotted element engaged therewith by means permitting relative lateral displacement without relative angular movement between these two parts, means (for example a brake) to hold the controlling-device from rotation when desired and thus to rotate the driven-member in the opposite direction from the driving shaft, and locking means between two of the said parts to prevent relative movement when desired and thus to cause the gear to rotate forwardly as one whole.

Preferably the controlling-device engaged with the cross-slotted element forms a clutch-part and the locking means comprise a co-operating clutch-part rotatable with the driving shaft and means to operatively engage the two clutch-parts together.

In one construction the controlling-device is engaged with the cross-slotted element by means of projections on the one part which coact with circular guides on the other part. Between the projections and the circular guides there may be an intermediate slipper-plate.

Preferably one actuating member is arranged to operate the clutch and also the brake so that when the clutch is engaged the brake is released and vice versa.

The member carrying the cross-slotted element preferably takes the form of a shaft having an enlarged head containing an eccentrically-disposed journal and the cross-slotted element has a stem which enters the journal. There may also be a bearing supporting the outside of the enlarged head of the shaft. In this way the cross-slotted member is supported against lateral stresses close up to the point where these stresses are applied. With the same object the member having the crank pins carries at that end where the crank pins are located an eccentric housed in the cross-slotted element in such manner as to transmit lateral stress directly from the shaft to the cross-slotted element. Provision of such an eccentric is of value generally in driving gear comprising a rotatable member having crank pins to engage an eccentrically-disposed cross-slotted element.

One form of driving gear in which the invention is embodied will now be described with reference to the accompanying drawings in which Figure 1 shows a longitudinal vertical section through the gear;

Figure 2 is a transverse section upon the line 2—2 of Figure 1;

Figure 3 is a detail of the cross-slotted element;

Figure 4 is a plan showing the means for operating the brake on the controlling device.

The gear comprises a driving-shaft A and a coaxial driven-shaft B supported in bearings $A^1$, $B^1$ respectively in a casing C. The driving shaft A has outside the casing a flange $A^2$ for coupling to any source of power, for example a petrol motor. It extends partly across the inside of the casing and carries at its inner end a crank disc $A^3$ and carries two crank pins $A^4$ $A^5$; each crank pin carries a piston-shaped slipper-plate $A^6$ $A^7$ respectively.

A cross-slotted disc-shaped member D is provided having a stem $D^1$ supported in a journal $B^2$ located eccentrically in an enlarged head $B^3$ formed on the inner end of the shaft B. The head B³ carries a counterweight B⁴ to balance the cross-slotted member. Two intersecting bores D² D³ are formed in the member D and these are open for a portion of their length on the face of the disc away from the stem D¹, so that they constitute slots. The crank pins A⁴ A⁵ pass through the open sides of the slots and the piston-shaped slipper-plates A⁶ A⁷ work in their respective bores D³ and D². The eccentricity of the journal B² is equal to that of the crank pins A⁴ A⁵ and this is necessary in order to permit the mechanism to operate properly. The parts are so proportioned that the face of the cross-slotted member D is close to the end of the shaft A.

The member D has a flange D⁴ extending in an axial direction around its periphery. This flange fits closely the external periphery of an eccentric E, which is thus housed therein. The eccentric E is bored out to fit the crank disc A³ and it serves to transmit lateral stresses between the crank disc and the cross-slotted member without imposing these upon external supports.

The movements of the cross-slotted member D are controlled in such a manner that it can be held from rotation when desired, while lateral displacement is still permitted, by means of a controlling device in the form of a clutch-member F. The clutch-member F is supported upon the shaft A close to the crank disc A³ but is free to rotate on the shaft A, except as hereinafter described. On the face adjacent to the cross-slotted member D there are two circular recesses F¹ F². The flange D⁴ of the cross-slotted member carries two pins D⁵ D⁶ which enter the recesses F¹ F² and are provided with slipper-plates F³ F⁴ which fit the recesses. The size of the parts is such that the pins D⁶ can describe a circle relatively to the clutch-member F of the same radius as the radius of the crank pins A⁴ A⁵ and the stem D¹. Thus the cross-slotted member is free to be laterally-displaced relatively to the clutch-member F in a circular direction but is prevented from turning angularly in relation thereto. The clutch-member F is surrounded by a band-brake G by which it can be held from rotation when desired. Part of its periphery is also supported by a bearing H.

The face of the clutch-member F which lies away from the cross-slotted member D has a peripheral flange F⁵ extending in an axial direction and provided with internal teeth F⁶ which engage clutch-plates F⁷ F⁸. Between the clutch-plates F⁷ F⁸ are cooperating clutch-plates K¹ K² which are engaged by internal teeth with projections K³ on a co-operating clutch part K⁴ keyed to the shaft A. These parts constitute a plate-clutch. The outermost plate F⁸ is provided with lugs F⁹ in which are pivoted bell-crank levers L for operating the clutch. One arm of the bell-crank levers L extends in a direction more or less parallel to the shaft A and each of these levers is connected by a link L¹ to an axially movable sleeve L². The other arms of the bell-crank levers extend inwardly towards the clutch-part K⁴ and enter a groove K⁵ in an adjustable collar K⁶ screwed thereon. This collar is adjustable on the part K⁴ and is locked by the nut K⁷. The axially-movable sleeve L² carries a loose collar L³ having pins L⁴ which enter a yoked lever L⁵ supported by a clutch-operating shaft L⁶.

The clutch-operating shaft L⁶ also carries a lever L⁷ on which is pivoted a push-rod L⁸. The band-brake G has ears G¹ for a bolt G² the head of which is forked to receive the push-rod L⁸. In the arms of the fork behind the push-rod there is riveted a roller G³ and the push-rod has an inclined cam surface L⁹ for co-operation with the roller.

In operation, if the clutch-operating shaft L⁶ is rotated in such a direction as to move the sleeve L² from the position shown in chain line to the position shown in full lines in Figure 1, the clutch F—K⁴ is thrown into engagement. The clutch-member F is thereby caused to rotate with the shaft A and as these two parts of the mechanism are locked together, relative movement of all the other parts of the mechanism is prevented and the gear rotates as one whole, driving the shaft B in a forward direction without any loss of power through relative movement of the parts. If, however, the clutch-controlling shaft L⁶ is turned in the other direction the levers L assume the position indicated in chain lines in Figure 1, the clutch F—K⁴ is thrown out of operation, the push-rod L⁸ is forced towards the band-brake G and its cam portion L⁹ acts on the roller G³ so that the brake is applied. Rotation of the clutch-member F is thus prevented and the cross-slotted member D is thereby held from rotating with the shaft A. The action of the crank pins A⁴ A⁵ causes it to be displaced bodily in a circular path in a direction opposite to the rotation of the shaft A and the stem D¹ transmits this movement to the head B³ of the shaft B. Thus the shaft B is reversely driven.

It will be understood that if desired, force may be imparted to the shaft B and power taken from the shaft A instead of as above described, imparting the force to the shaft A and using B as the driven shaft.

It is also to be understood that while the mechanism has been described above as forming a self-contained reversing unit complete in itself, it may equally well be employed as part of other gearing. For example the shaft B may be connected to a speed-reduction gear or a variable speed gear.

What I claim as my invention and desire to secure by Letters Patent is:—

1. In a driving-gear the combination of a driving-member, a co-axial driven-member, an intermedate cross-slotted element supported by one of these members to turn about an axis eccentric thereto, crank pins upon the other member in engagement with the slots of the cross-slotted element, a controlling-device engaged with the cross-slotted element, projections on the one part whereby the controlling-device engages the cross-slotted element, slipper plates into which the projections enter, circular guides on the other part in engagement with the slipper plates so as to permit between them relative lateral circular displacement without relative angular movement, means to hold the controlling device from rotation when desired and thus to rotate the driven-member in the opposite direction from the driving-member, and locking means between two of the said parts to prevent relative movement when desired and thus to cause the gear to rotate forwardly as one whole.

2. In a driving-gear the combination of a driving-member, a co-axial driven-member, one of these members being in the form of a shaft having an enlarged head, an eccentrically-disposed journal in the head, an intermediate cross-slotted element having a stem which enters the journal, crank-pins upon the other member in engagement with the slots of the cross-slotted element, a controlling-device for the cross-slotted element engaged therewith by means permitting relative lateral displacement without relative angular movement between these two parts, means to hold the controlling-device from rotation when desired and thus to rotate the driven-member in the opposite direction from the driving-member, and locking means between two of the said parts to prevent relative movement when desired and thus to cause the gear to rotate forwardly as one whole.

3. In a driving-gear the combination of a driving-member, a co-axial driven-member, one of these members being in the form of a shaft having an enlarged head, a bearing supporting the outside of said head, an eccentrically-disposed journal in the head, an intermediate cross-slotted element having a stem which enters the journal, crank-pins upon the other member in engagement with the slots of the cross-slotted element, a controlling-device for the cross-slotted element engaged therewith by means permitting relative lateral displacement without relative angular movement between these two parts, means to hold the controlling-device from rotation when desired and thus to rotate the driven-member in the opposite direction from the driving-member, and locking means between two of the said parts to prevent relative movement when desired and thus to cause the gear to rotate forwardly as one whole.

4. In a driving-gear the combination of a driving-member, a co-axial driven-member, one of these members being in the form of a shaft having an enlarged head, an eccentrically disposed journal in the head, an intermediate cross-slotted element having a stem which enters the journal, crank-pins upon the other member in engagement with the slots of the cross-slotted element, a clutch-part engaged with the cross-slotted element by means permitting relative lateral displacement without relative angular movement between these two parts, means to hold the clutch-part from rotation when desired and thus to rotate the driven-member in the opposite direction from the driving-member, a co-operating clutch-part rotatable with the driving-member and means to engage the two clutch-parts operatively together when desired and thus to cause the gear to rotate forwardly as one whole.

5. In a driving-gear the combination of a driving-member, a co-axial driven-member, an intermediate cross-slotted element supported by one of these members to turn about an axis eccentric thereto, crank pins upon the other member in engagement with the slots of the cross-slotted element, an eccentric having a bearing on the cross-slotted element and also on the member on which are the crank pins, so as to transmit lateral strains directly from the member to the cross-slotted element, a controlling-device for the cross-slotted element engaged therewith by means permitting relative lateral displacement without relative angular movement between these two parts, means to hold the controlling-device from rotation when desired and thus to rotate the driven-member in the opposite direction from the driving-member, and locking means between two of the said parts to prevent relative movement when desired and thus to cause the gear to rotate forwardly as one whole.

6. In a driving-gear, a rotatable member having crank-pins, an eccentrically-disposed cross-slotted element engaged by said crank-pins, and an eccentric upon the said rotatable member which is housed in the cross-slotted element in such manner as to transmit lateral strains directly from the rotatable member to the cross-slotted element.

7. In a driving-gear the combination of a driving-member, a co-axial driven-member, one of these members being in the form of a shaft having an enlarged head, an eccentrically-disposed journal in the head, an intermediate cross-slotted element having a stem which enters the journal, crank pins upon the other member in engagement with the slots of the cross-slotted element, an eccentric having a bearing on the cross-slotted element and also on the member on which are the crank pins, so as to transmit lateral strains directly from the member to the cross-slotted element, a controlling-device for the cross-slotted element engaged therewith by means permitting relative lateral displacement without relative angular movement between these two parts, means to hold the controlling-device from rotation when desired and thus to rotate the driven-member in the opposite direction from the driving-member, and locking means between two of the said parts to prevent relative movement when desired and thus to cause the gear to rotate forwardly as one whole.

8. In a driving gear the combination of a driving-member, a co-axial driven-member, one of these members being in the form of a shaft having an enlarged head, an eccentrically-disposed journal in the head, an intermediate cross-slotted element having a stem which enters the journal, crank pins upon the other member in engagement with the slots of the cross-slotted element, an eccentric having a bearing on the cross-slotted element and also on the member on which are the crank pins, so as to transmit lateral strains directly from the member to the cross-slotted element, a clutch-part engaged with the cross-slotted element by means permitting relative lateral displacement without relative angular movement between these two parts, means to hold the clutch-part from rotation when desired and thus to rotate the driven-member in the opposite direction from the driving-member, a co-operating clutch-part rotatable with the driving-member and means to engage the two clutch-parts operatively together when desired and thus to cause the gear to rotate forwardly as one whole.

In testimony whereof I affix my signature.

HARRY HIORNS.